(12) United States Patent
Sovel et al.

(10) Patent No.: US 10,960,806 B1
(45) Date of Patent: Mar. 30, 2021

(54) VEHICLE RAMP RESISTANT APPARATUS

(71) Applicant: United States of America as represented by the Secretary of the Navy, Arlington, VA (US)

(72) Inventors: James Sovel, Panama City Beach, FL (US); John Ducote, Panama City Beach, FL (US); Hal Rhea, Panama City Beach, FL (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 196 days.

(21) Appl. No.: 16/367,896

(22) Filed: Mar. 28, 2019

(51) Int. Cl.
*F16M 13/00* (2006.01)
*B60P 3/10* (2006.01)
*F16M 13/02* (2006.01)
*B66F 7/24* (2006.01)
*B63C 3/02* (2006.01)

(52) U.S. Cl.
CPC ......... *B60P 3/1066* (2013.01); *F16M 13/005* (2013.01); *F16M 13/02* (2013.01); *B63C 3/02* (2013.01); *B66F 7/243* (2013.01); *F16M 2200/021* (2013.01)

(58) Field of Classification Search
CPC .. F16M 13/005; F16M 13/02; F16M 2200/00; F16M 2200/06; B60P 1/435; B60P 1/438; B60P 1/43; B62D 33/0273
See application file for complete search history.

(56) References Cited

U.S. PATENT DOCUMENTS

| | | | |
|---|---|---|---|
| 3,511,393 A * | 5/1970 | Abromavage | B60P 1/431 414/537 |
| 5,133,634 A * | 7/1992 | Gingrich | B60P 1/431 14/71.1 |
| 5,253,410 A * | 10/1993 | Mortenson | B60P 1/431 14/71.1 |
| 8,166,593 B1 * | 5/2012 | Trauernicht | B65G 69/30 14/71.1 |
| 10,568,786 B1 * | 2/2020 | Nunn | B60P 1/43 |

* cited by examiner

*Primary Examiner* — Amy J. Sterling
(74) *Attorney, Agent, or Firm* — James T. Shepherd

(57) ABSTRACT

A ramp restraint apparatus for a vehicle includes an elongate, rigid restraint bar having one end rotatably attached to the ramp and a free end having a notch and a roller at its tip. The restraint bar travels over a bar support on a lock/release assembly mounted to a vehicle bulkhead. The bar support is shaped at one end to receive the notch of the bar and hold the bar in place when the ramp is fully deployed. A release arm has a cam follower that pushes up on and releases the restraint bar when the release arm is rotated, allowing the ramp to close. When the ramp is fully closed, a storage bracket receives and holds the inboard end of the restraint bar.

20 Claims, 8 Drawing Sheets

VEHICLE RAMP RESISTANT APPARATUS

STATEMENT OF GOVERNMENT INTEREST

The invention described herein may be manufactured and used by or for the Government of the United States of America for Governmental purposes without the payment of any royalties.

BACKGROUND OF THE INVENTION

The U.S. Navy currently uses an amphibious craft called the Landing Craft Air Cushion (LCAC) to transport equipment, cargo, and personnel from a ship at sea to the shore. To do this, the LCAC has a deployable/stowable, i.e. droppable and liftable, ramp which, when deployed, acts as a platform connecting to a cargo deck within the LCAC that provides a pathway for vehicles to exit the craft. However, when lowered in a sea state, the action of waves and other environmental forces can cause the ramp to move in response, which potentially can damage the ramp or adjacent structure. It can also make loading and unloading vehicles onto the ramp difficult, as nothing restrains the ramp against upward buffeting except the weights of the vehicles themselves.

SUMMARY OF THE INVENTION

Accordingly, an object of the invention is to provide an apparatus that restrains a vehicle's ramp against upward movement resulting from external forces such as buffeting caused by sea waves.

Another object is to provide an automatic, positively locking restraint of a large ramp when fully deployed to prevent injury to personnel, damage to the vehicle, and damage to cargo due to slamming of the ramp while at sea during loading and unloading operations.

Another object is to provide a simple mechanical apparatus that is readily mountable on the existing structure of the vehicle, such as a deck or bulkhead, and remotely operated by personnel.

Another object is to provide an apparatus that requires little modification to the vehicle's structure and requires little to no human interaction to utilize it.

In accordance with these and other objects made apparent hereinafter, a ramp restraint apparatus is provided that includes an elongate, rigid restraint bar having an inboard end and an outboard end. The outboard end of the restraint bar is configured to rotatably mount to an interior surface of the ramp. The inboard end has a notch disposed on the underside thereof and preferably has a travel roller mounted to its tip.

A bar support is mounted on an interior bulkhead of the vehicle proximate to the ramp. The bar support may be mounted directly to the bulkhead or to a lock/release assembly having a weldment plate that is mounted to the bulkhead. The bar support has an edge shaped to accept and hold the notch in the restraint bar when the ramp is fully deployed. In the preferred embodiment, the notch in the restraint bar and the edge of the bar support have rounded shapes. The restraint bar is configured to travel over the bar support as the ramp is deployed and retracted. Preferably, a travel roller is mounted to the bar support and positioned so that the restraint bar travels over the travel roller as well as the bar support as the ramp is deployed and retracted.

A cover plate is preferably mounted on the bar support, having a portion extending above the bar support to form a U-shaped channel through which the restraint bar is constrained to travel as the ramp is deployed and retracted.

A release plate is mounted on the upper edge of the inboard end of the restraint bar, forming a flange-like extension. A release arm is rotatably mounted to the lock/release assembly. The upper end of the release arm has a lower cam follower disposed on it proximate to and underneath the release plate and positioned to abut and push up on the release plate when the release arm is rotated in a counterclockwise direction. The upper end of the release arm also has an upper cam follower on it proximate to and above the release plate and positioned to abut and push down on the release plate when the release arm is rotated in a clockwise direction. A tension spring has one end coupled to the release arm and a second end coupled to the bulkhead or weldment plate, and is biased to rotate the release arm in a clockwise direction.

In one embodiment, the release arm has an elongate lever portion at its lower end, distant from the upper and lower cam followers. This lever portion may include a hole to which a lanyard may be tied to manually rotate the release arm counterclockwise to overcome the force of the spring and release the restraint bar.

A storage bracket may also be mounted on an interior surface of the vehicle, such as on the deck in the cargo compartment. The storage bracket is configured to accept and hold the inboard end of the restraint bar when the ramp is fully retracted. The outboard end of the restraint bar may have a turnbuckle for precisely adjusting the length of the restraint bar.

In another embodiment of the invention, a ramp system is provided for a vehicle having a cargo compartment with a deck. The system includes a rotatable ramp having a point of rotation proximate to the deck and configured to open outward from the cargo compartment when deployed. A cable has one end attached to an interior surface of the ramp and a second end coupled to a winch for raising and lowering the ramp.

An elongate, rigid restraint bar has an outboard end rotatably mounted to the ramp and an inboard having a notch disposed on the underside thereof and, preferably, a travel roller mounted at its tip.

A bar support is mounted on an interior bulkhead of the vehicle proximate to the ramp. The bar support may be mounted directly to the bulkhead or to a lock/release assembly having a weldment plate that is mounted to the bulkhead. The bar support has an edge shaped to accept and hold the notch in the restraint bar when the ramp is fully deployed. In the preferred embodiment, the notch in the restraint bar and the edge of the bar support have rounded shapes. The restraint bar is configured to travel over the bar support as the ramp is deployed and retracted. Preferably, a travel roller is mounted to the bar support and positioned so that the restraint bar travels over the travel roller as well as the bar support as the ramp is deployed and retracted.

A cover plate is preferably mounted on the bar support, having a portion extending above the bar support to form a U-shaped channel through which the restraint bar is constrained to travel as the ramp is deployed and retracted.

A release plate is mounted on the upper edge of the inboard end of the restraint bar, forming a flange-like extension. A release arm is rotatably mounted to the lock/release assembly. The upper end of the release arm has a lower cam follower disposed on it proximate to and underneath the release plate and positioned to abut and push up on the release plate when the release arm is rotated in a counterclockwise direction. The upper end of the release arm also has an upper cam follower on it proximate to and above the release plate and positioned to abut and push down on the release plate when the release arm is rotated in a clockwise direction. A tension spring has one end coupled to the release arm and a second end coupled to the bulkhead or weldment plate, and is biased to rotate the release arm in a clockwise direction.

In one embodiment, the release arm has an elongate lever portion at its lower end, distant from the upper and lower cam followers. This lever portion may include a hole to which a lanyard may be tied to manually rotate the release arm counterclockwise to overcome the force of the spring and release the restraint bar.

A storage bracket may also be mounted on an interior surface of the vehicle, such as on the deck in the cargo compartment. The storage bracket is configured to accept and hold the inboard end of the restraint bar when the ramp is fully retracted. The outboard end of the restraint bar may have a turnbuckle for precisely adjusting the length of the restraint bar.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION

Figure 1:
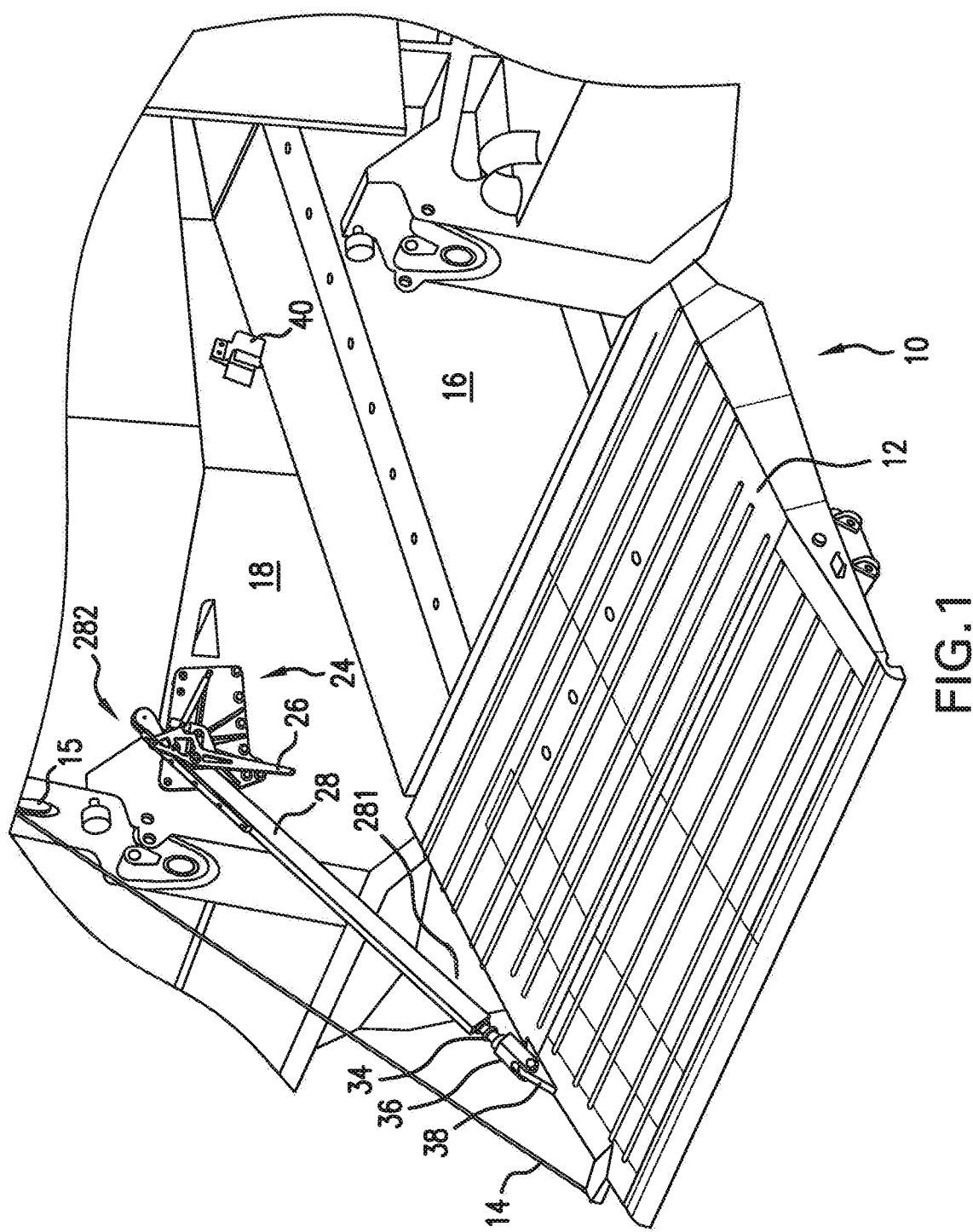
FIG. 1 is an elevational isometric view of the loading/unloading area of a LCAC employing an embodiment of the invention mounted on an interior bulkhead of the vehicle and attached to its deployment ramp.

With reference to the drawing figures, wherein like numbers indicate like parts throughout the several views, FIG. 1 shows a vehicle 10 (in this case, an LCAC) with a ramp 12 deployed, i.e., lowered to form a continuous path with loading deck 16 within the cargo compartment of vehicle 10. Cable 14 attaches to ramp 12, and is played out or rewound by winch or drive 15 so as to controllably lower or raise ramp 12. The outboard end 281 of restraint bar 28 connects to a ramp bracket 38 mounted on ramp 12 via turnbuckle 34 and clevis pin assembly 36. A lock/release assembly 24 is mounted on a bulkhead 18 proximate to and inboard of ramp 12. Restraint bar 28 rests on, travels on, and is locked in place by lock/release assembly 24 in a manner described below. A storage bracket 40 is mounted on bulkhead 18 inboard of lock/release assembly 24 where it can receive the inboard end 282 of restraint bar 28 when the ramp is closed. Note that storage bracket 40 may also be mounted on the deck 16 instead of on bulkhead 18 without departing from the scope of this invention, as long as it is positioned to receive the inboard end 282 of restraint bar 28.

Figure 2:
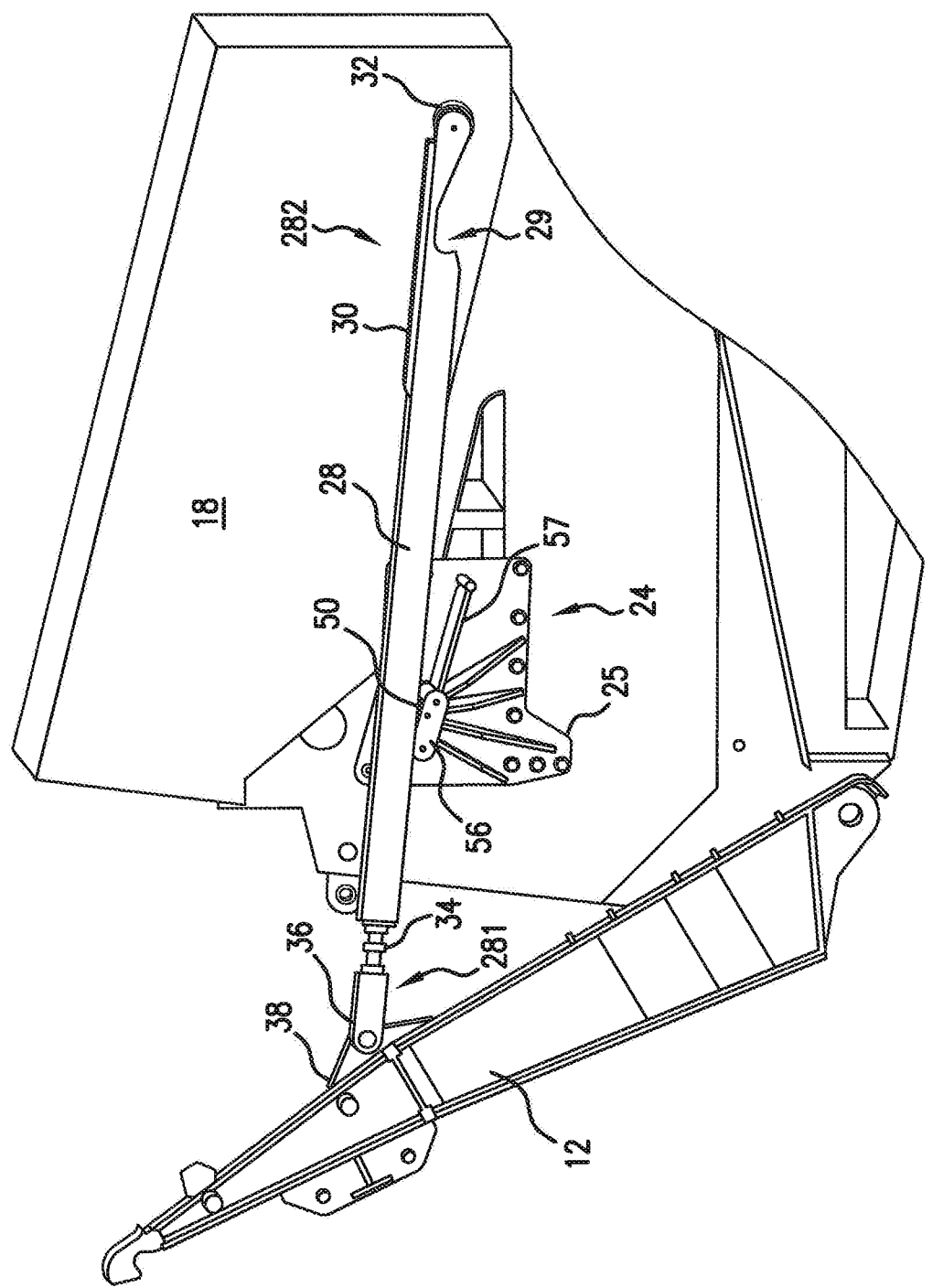
FIG. 2 is a side view showing the LCAC ramp and restraint bar partially deployed, with the restraint bar resting on a portion of the lock/release assembly.
Figure 3:
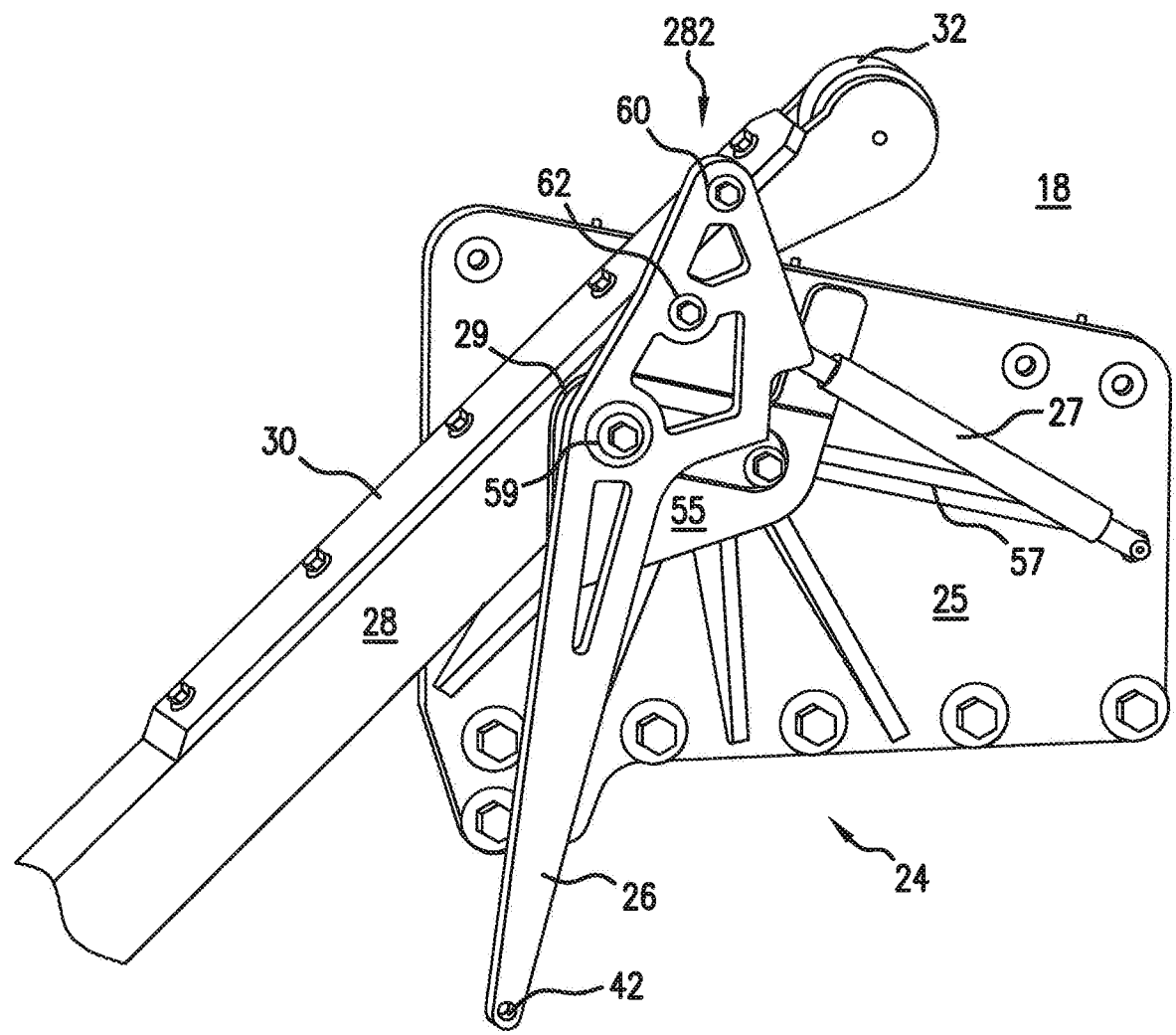
FIG. 3 is a side view detail of the lock/release assembly and the inboard end of the restraint bar.
Figure 4:
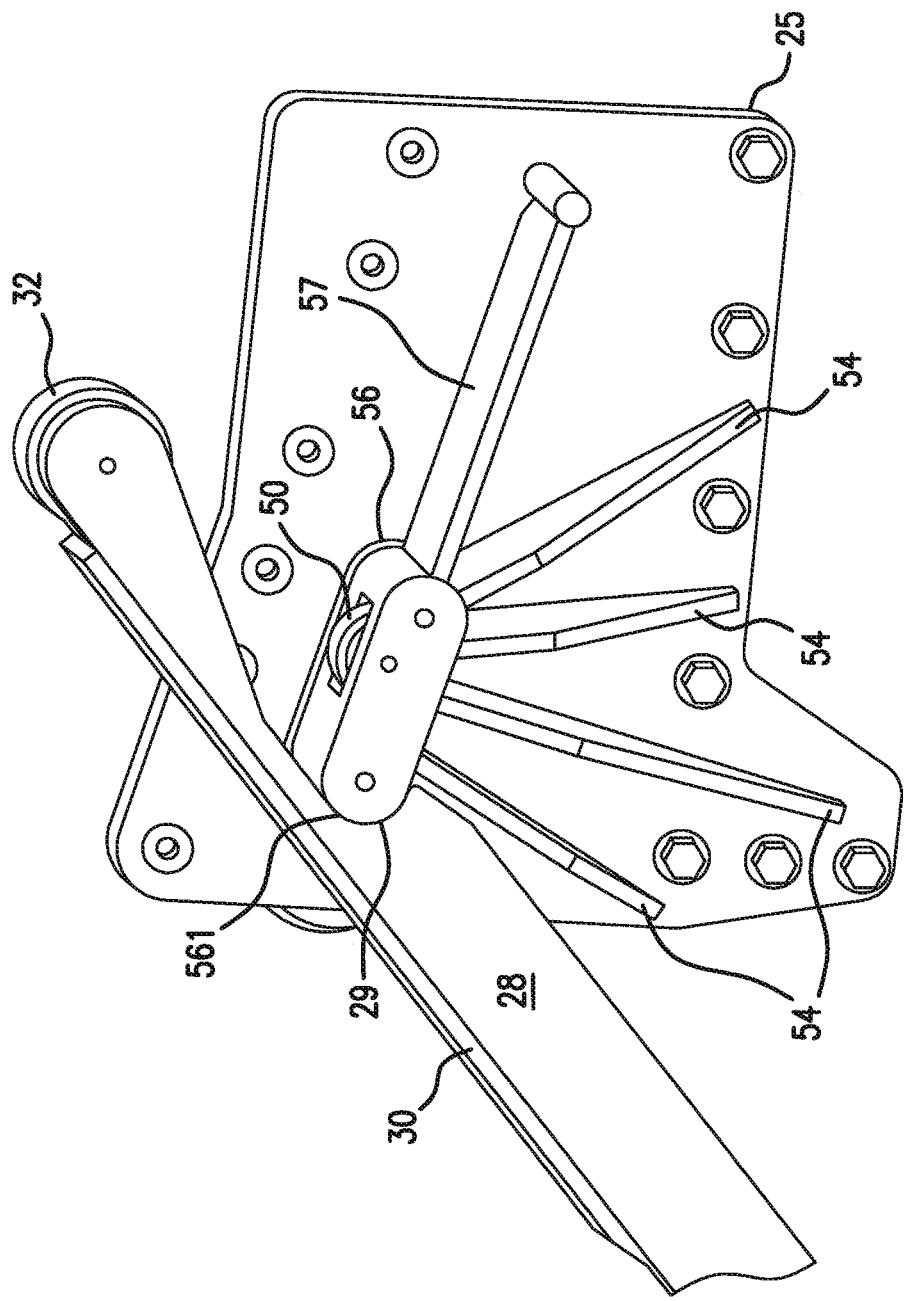
FIG. 4 is a side view detail of the lock/release assembly, with some parts not shown for clarity, and the restraint bar locked in place.

FIGS. 2-4 show details of restraint bar 28 and lock/release assembly 24. The inboard end 282 of restraint bar 28 has a notch 29 cut into its lower edge and an end roller 32 mounted on its tip. A release plate 30 is affixed to the top edge of restraint bar 28, also at the inboard end 282. Release plate 30 has a width that is wider than the restraint bar edge to create a flange-like extension.

Lock/release assembly 24 has a weldment plate 25 attached to bulkhead 18 via bolts, welding, or other suitable method known in the art. Plate 25 may also have ribs 54 to mechanically strengthen plate 25.

Referring particularly to FIGS. 2 and 4, in which some parts of the lock/release assembly are removed for clarity, bar support 56 and support extension 57 are affixed to weldment plate 25. Cover plate 55 (FIG. 3) is mounted to the outer surface of bar support 56, thereby forming a U-shaped channel between itself and weldment plate 25 through which restraint bar 28 can slide, constraining restraint bar 28 to remain on bar support 56. A travel roller 50 is disposed in bar support 56 to facilitate the sliding of restraint bar 28 along bar support 56. Bar support 56 has a shaped edge 561, preferably rounded, at its rear-facing end. As shown in FIG. 4, the shaped edge 561 is shaped to match the curvature of notch 29 in restraint bar 28. When ramp 12 is fully opened (as shown in FIG. 1) restraint bar 28 drops into position so that notch 29 engages shaped edge 561, thereby locking restraint bar 28 in place and, in turn, restraining ramp 12 against upward movement. It should be noted that, while notch 29 and edge 561 preferably have rounded geometries, they can be formed in any complementary shapes suitable for holding restraint bar 28 firmly in place when axial loads are placed on it due to movement of ramp 12 caused by, e.g., wave action. Yet, the shapes should be selected to readily allow the release of restraint bar 28 as described below.

Release arm 26 is mounted for rotation about pivot 59. It has upper and lower cam followers 60, 62 disposed therein to locate respectively above and below release plate 30 of restraint bar 28. Tension spring 27 is coupled to release arm 26 and weldment plate 25 and is biased to rotate release arm 26 clockwise to pull upper cam follower 60 down against release plate 30, thereby holding notch 29 firmly in place against shaped edge 561 when restraining arm 28 is fully extended and ramp 12 is in the opened position. Lower cam follower 62 is positioned so that, when release arm 26 is rotated counterclockwise to overcome the force of tension spring 27, lower cam follower pushes up on the bottom of release plate 30. This causes notch 29 to disengage from shaped edge 561 and allows restraint bar 28 to retract into the vehicle over travel roller 50, bar support 56, and support extension 57 when the ramp 12 is raised. Release arm 26 can have an elongated lever portion with a release arm hole 42 disposed in its distal end. The counterclockwise rotation of release arm 26 can be caused by pulling on a rope, or lanyard, (not shown) attached via, e.g., release arm hole 42.

Alternatively, the counterclockwise rotation can be accomplished by other means such as an electrical or hydraulic actuator coupled to release arm 26.

Figure 5A:
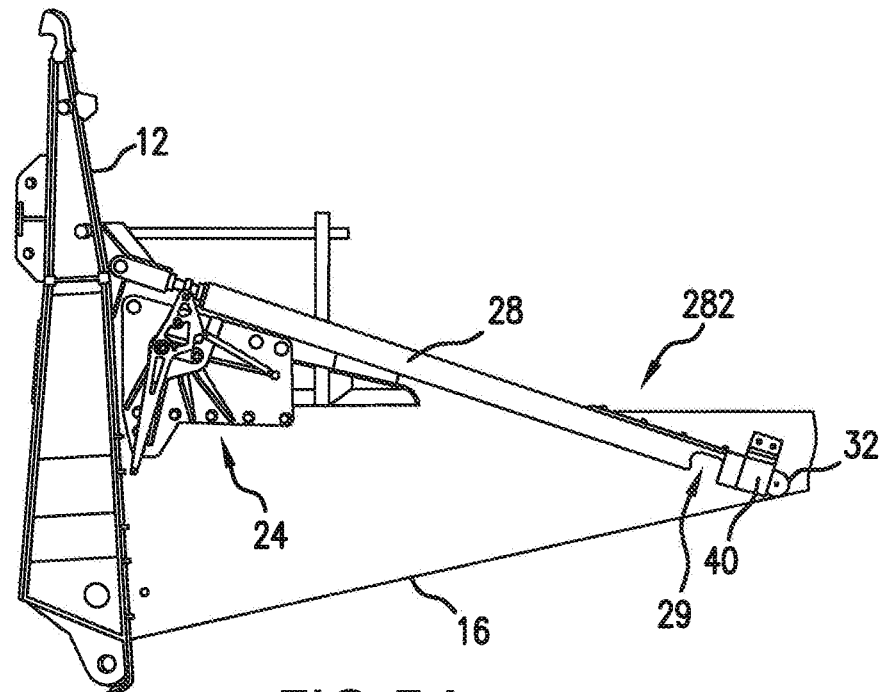
FIGS. 5a-5f are side views illustrating various positions of the ramp and the apparatus of the invention from fully closed to fully deployed.
Figure 5B:
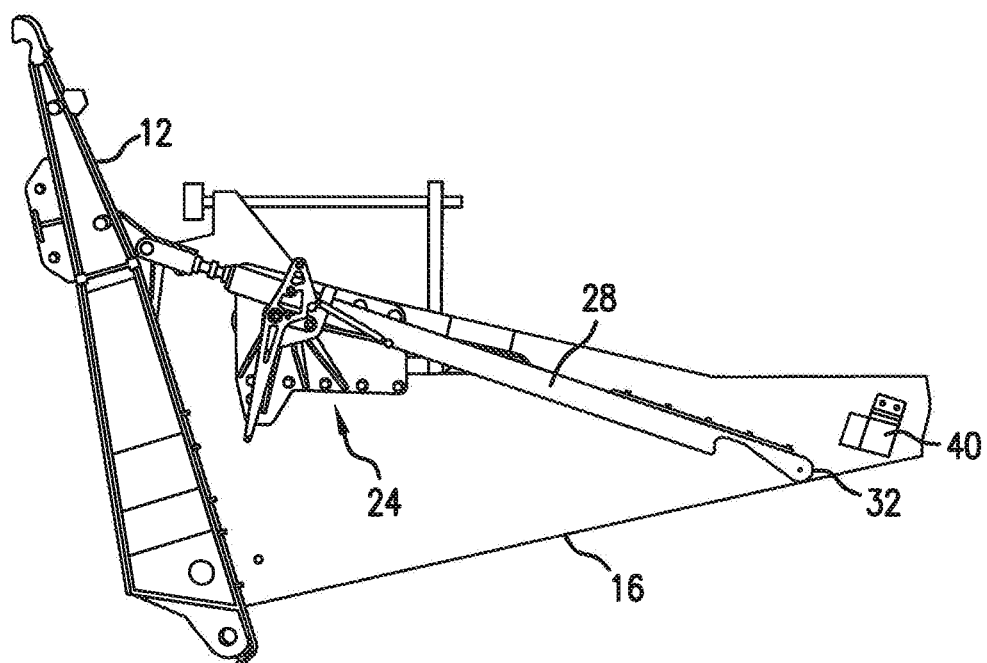
Figure 5C:
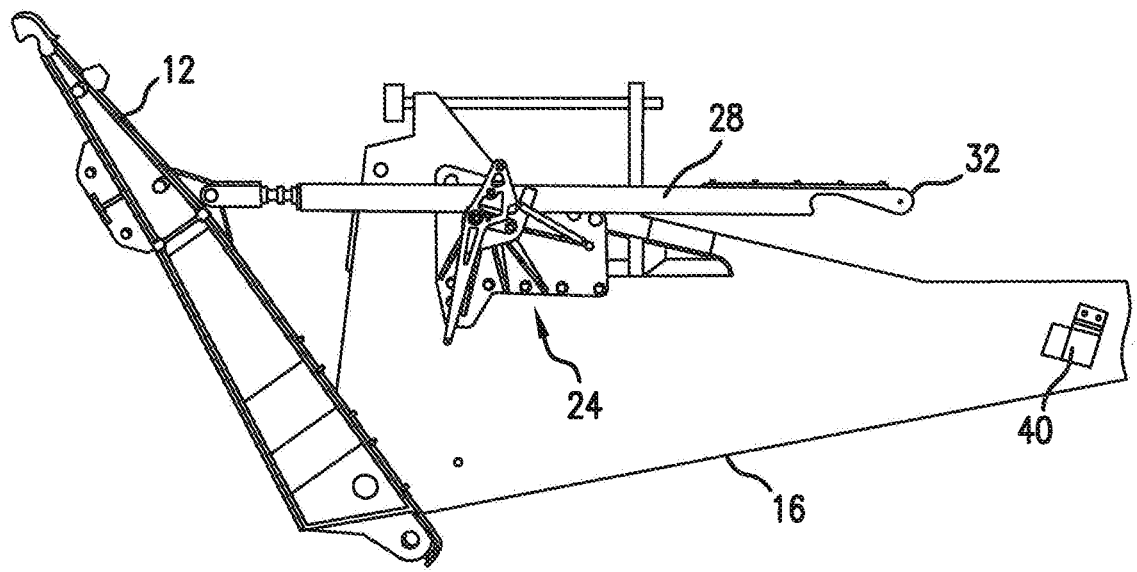
Figure 5D:
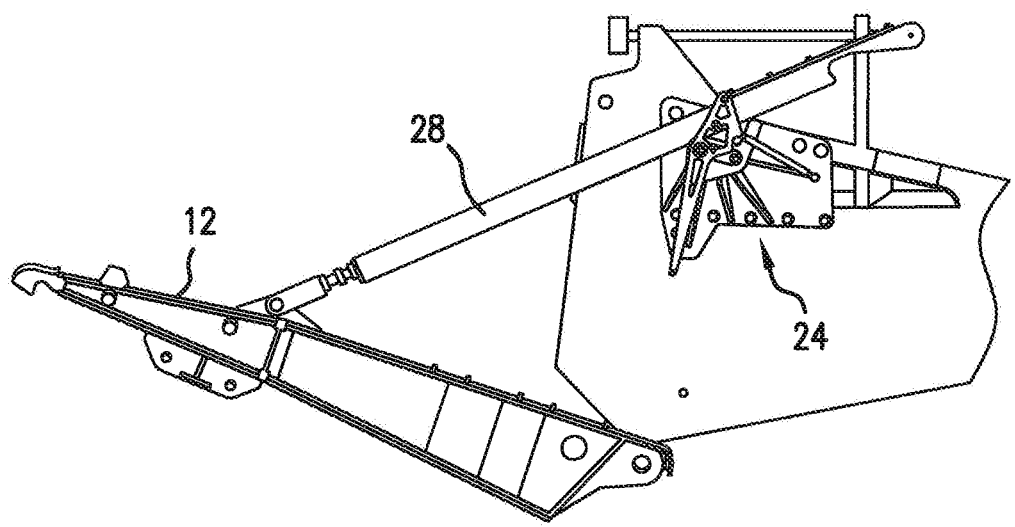
Figure 5E:
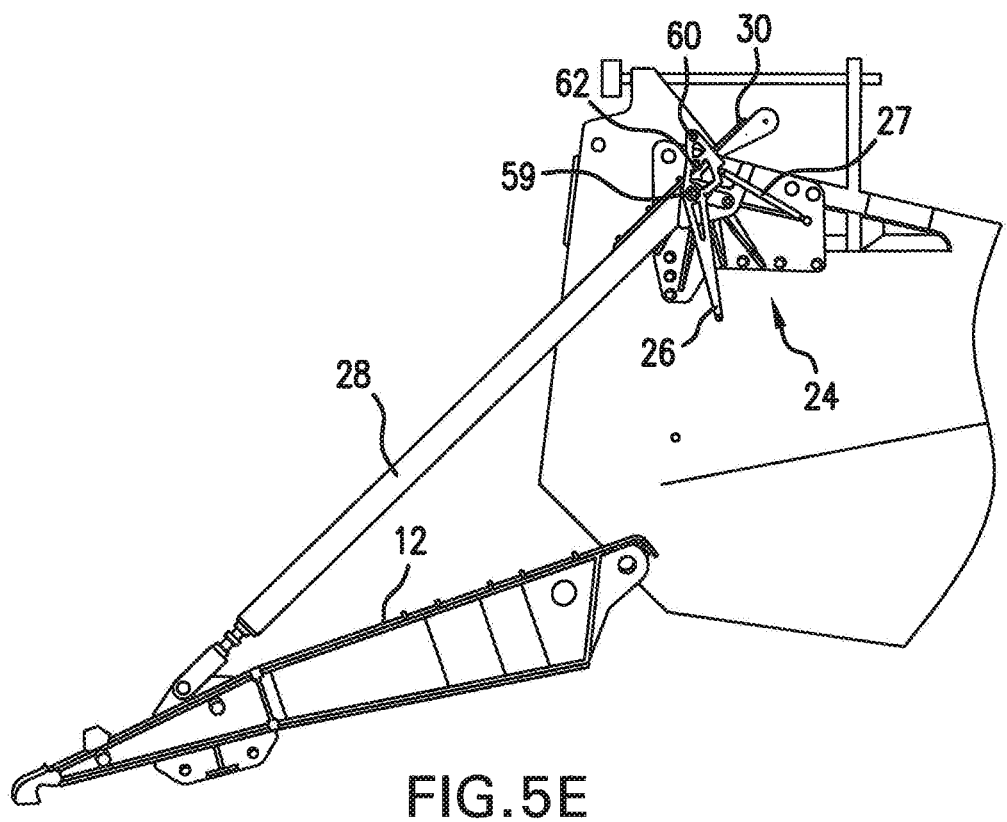
Figure 5F:
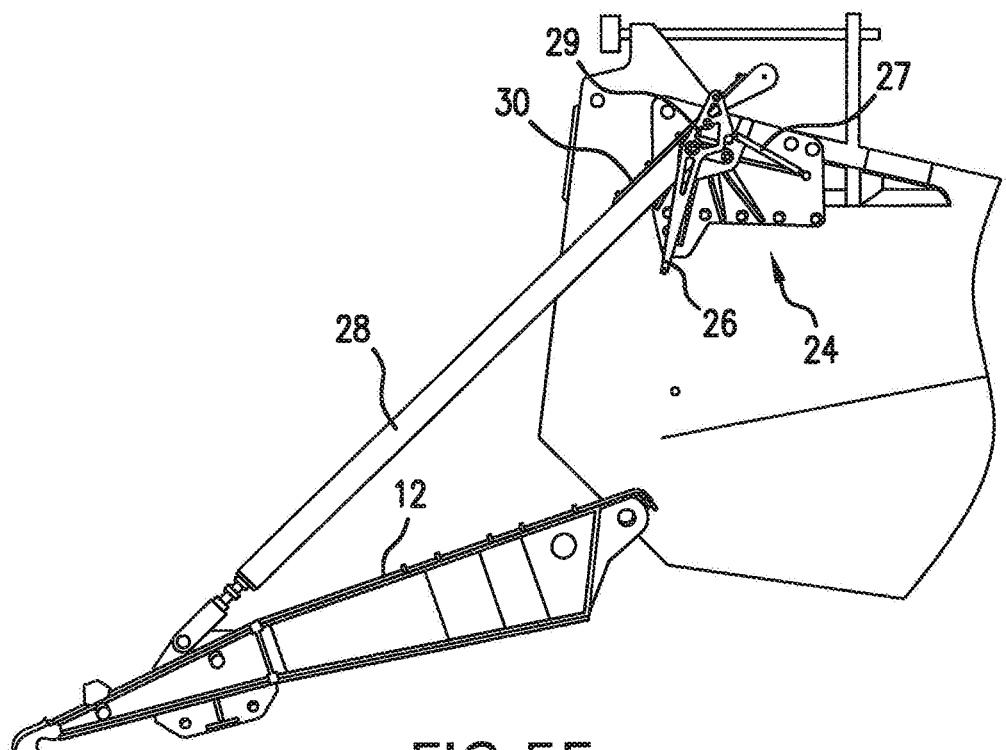
Figure 6A:
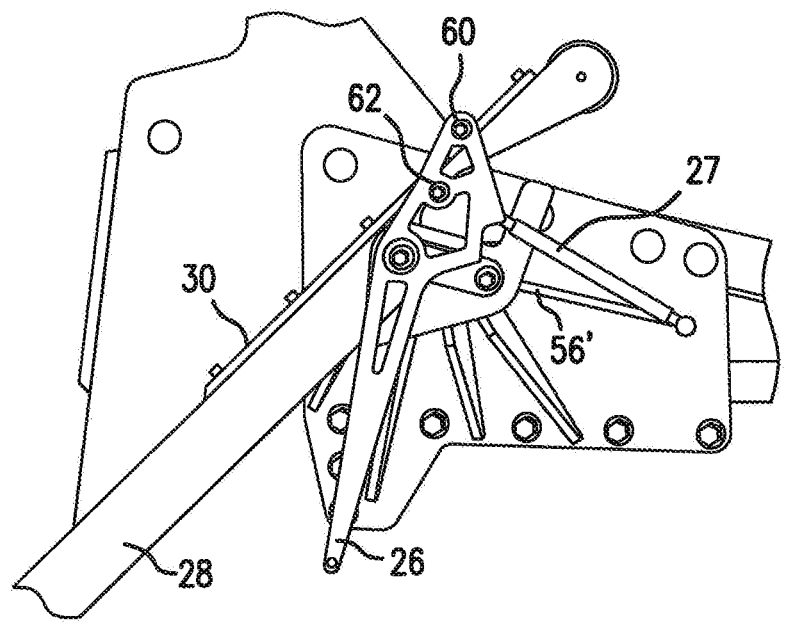
FIGS. 6a and 6b are side view details of the lock/release assembly with the restraint bar in locked and released positions, respectively.

FIGS. 5a through 5f illustrate the disposition of the invention during different stages of deployment and retraction of ramp 12. In FIG. 5a, ramp 12 is closed and restraint bar 28 is stowed so that its inboard end 282 is positioned within storage bracket 40. End roller 32 rests on deck 16. In FIG. 5b, ramp 12 has begun deployment, pulling restraint bar 28 out of storage bracket 40 and drawing end roller 32 along deck 16. As ramp 12 further deploys to the position of FIG. 5c, restraint bar 28 rotates about lock/release assembly 24, causing end roller 32 to lift off of deck 16. Referring now to FIGS. 5c and 5d, as ramp 12 continues to deploy, restraint bar 28 travels longitudinally across travel roller 50, bar support 56, and support extension 57 (not shown in FIGS. 5a-5f for clarity) while being constrained from lateral movement off of lock/release assembly 24 by cover plate 55. As ramp 12 approaches its fully deployed position, as shown in FIG. 5e, release plate 30 slides between cam followers 60 and 62 and pushes up on upper cam follower 60 (lower cam follower 62 being below plate 30), thereby causing release arm 26 to rotate counterclockwise about pivot 59 to overcome the force of tension spring 27. When ramp 12 reaches its fully deployed position, the restraint bar's notch 29 drops down and engages shaped edge 561. When this happens, the upward pressure exerted by release plate 30 on upper cam follower 60 is released, allowing tension spring 27 to securely hold notch 29 against shaped edge 561 and, thus, keep the restraint bar 28 in the locked position shown in FIGS. 5f and 6a.

Figure 6B:
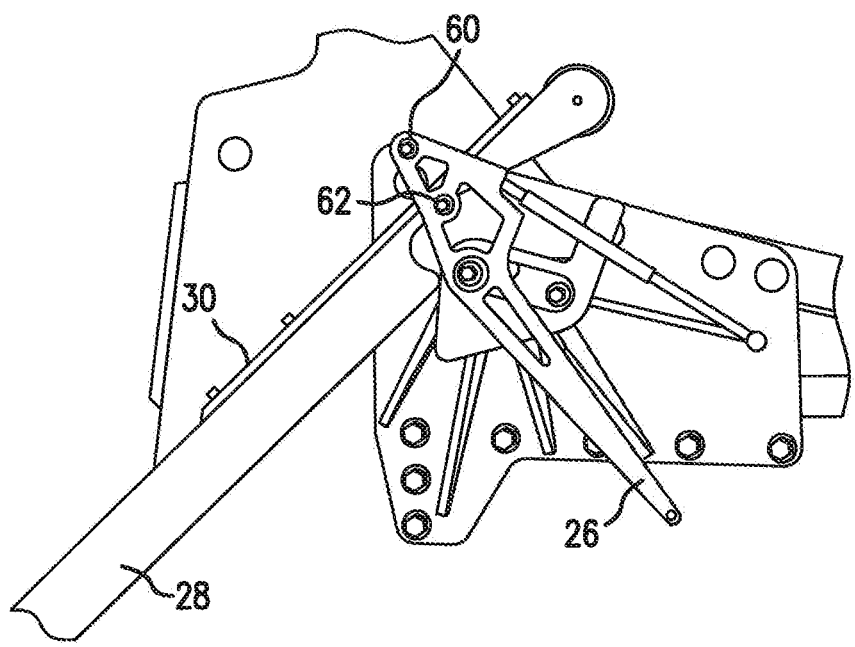

To release the restraint bar 12 from the locked position and allow ramp 12 to be raised, release arm 26 is rotated counterclockwise about pivot 59. As discussed above, this can be done by pulling a lanyard attached to release arm hole 42 or by other means known in the art such as an electrical or hydraulic actuator. This movement causes lower cam follower 62 to push up on release plate 30, thereby disengaging notch 29 from bar support 56, as illustrated in FIG. 6b. Restraint bar 28 is then free to travel inboard over lock/release assembly 24 as the ramp 12 is retracted by cable 14. Retrain bar 28 essentially follows the same path as described above when ramp 12 is deployed, but in reverse order, until the ramp is fully retracted, end roller 32 rests on deck 16, and the inboard end 282 of restraint bar 28 is securely stowed in storage bracket 40, as illustrated in FIG. 5a.

It may become desirable or necessary at times to adjust the length of restraint bar 28 so that notch 29 properly engages bar support 56 when ramp 12 is at the required/preferred deployed position. This adjustment may be accomplished precisely by adjusting turnbuckle 34, as is known in the art.

The apparatus described herein can be made of a variety of materials so long as they can support the expected loads in the anticipated environment. In one exemplary embodiment, where the apparatus is used on a seagoing vessel (i.e., an LCAC) in which weight considerations are critical and the environment is often harsh, restraint arm 28 and lock/release assembly 24 are made of aluminum, which is strong, light, and relatively resistant to salt water corrosion. Alternatively, if greater strength of the supporting structure is required, stainless steel components may be used.

The invention has been described in what is considered to be the most practical and preferred embodiments. It is recognized, however, that obvious modifications to these embodiments may occur to those with skill in the art. For example, although the exemplary embodiment illustrated and described herein applies to LCAC vehicles, the invention can obviously work with a wide variety of vehicles or other structures in a wide variety of environments, which could include anything from locking doors against intruders, to selectively opening or closing baffles such as one can find in air ducts, as two examples.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A restraint apparatus for a vehicle ramp that can be deployed and retracted, comprising:
   an elongate, rigid restraint bar having an inboard end and an outboard end, said outboard end configured to mount to an interior surface of the ramp, said inboard end having a notch disposed on the underside thereof; and
   a bar support mounted on an interior bulkhead of the vehicle proximate to the ramp, said bar support having an edge shaped to accept and hold said notch when the ramp is fully deployed; wherein
   said restraint bar is configured to travel over said bar support as the ramp is deployed and retracted.

2. The restraint apparatus of claim 1, further comprising a travel roller mounted to said bar support, said travel roller positioned to allow said restraint bar to travel over said travel roller and said bar support as the ramp is deployed and retracted.

3. The restraint apparatus of claim 2, further comprising a cover plate mounted on said bar support and having a portion extending above said bar support to form a U-shaped channel through which said restraint bar is constrained to travel as the ramp is deployed and retracted.

4. The restraint apparatus of claim 3, further comprising:
   a release arm rotatably mounted to said bar support;
   a release plate disposed on the upper edge of said inboard end of said restraint bar, said release plate overhanging said upper edge to form a flange-like extension;
   a tension spring having a first end coupled to said release arm and a second end coupled to said bulkhead, said tension spring biased to rotate said release arm in a clockwise direction;
   a lower cam follower disposed on said release arm proximate to and underneath said release plate and positioned to abut and push up on said release plate when said release arm is rotated counterclockwise; and
   an upper cam follower disposed on said release arm proximate to and above said release plate and positioned to abut and push down on said release plate when said release arm is rotated clockwise.

5. The restraint apparatus of claim 4, further comprising a storage bracket mounted on an interior surface of the vehicle, said storage bracket configured to accept and hold said inboard end of said restraint bar when the ramp is fully retracted.

6. The restraint apparatus of claim 5, further comprising an end roller disposed in said inboard end of said restraint bar, said end roller sized to fit within said storage bracket.

7. The restraint apparatus of claim 6, wherein said outboard end of said restraint bar comprises a turnbuckle.

8. The restraint apparatus of claim 4, wherein said release arm has an elongate lever portion distant from said upper and lower cam followers.

9. The restraint apparatus of claim 4, wherein said notch and said edge of said bar support have rounded shapes.

10. A restraint apparatus for a vehicle ramp that can be deployed and retracted, comprising:
    an elongate, rigid restraint bar having an inboard end and an outboard end, said outboard end mountable to an interior surface of the ramp, said inboard end having a rounded notch disposed on the underside thereof and an end roller mounted on its tip;

a storage bracket mounted on an interior surface of the vehicle, said storage bracket configured to accept and hold said inboard end of said restraint bar when the ramp is fully retracted; and a lock/release assembly comprising
 a weldment plate mounted on a bulkhead of said vehicle proximate to the ramp, and
 a bar support mounted on said weldment plate, said bar support having a rounded edge shaped to accept and hold said notch when the ramp is fully deployed; wherein said restraint bar is configured to travel over said bar support as the ramp is deployed and retracted.

11. The restraint apparatus of claim 10, further comprising a travel roller disposed on said bar support; wherein said restraint bar is configured to travel over said travel roller and said bar support as the ramp is deployed and retracted.

12. The restraint apparatus of claim 11, further comprising a cover plate mounted on said bar support and having a portion extending above said bar support to form a U-shaped channel through which said restraint bar is constrained to travel as the ramp is deployed and retracted.

13. The restraint apparatus of claim 12, further comprising:
 a release arm rotatably mounted to said lock/release assembly;
 a release plate disposed on the upper edge of said inboard end of said restraint bar, said release plate overhanging said upper edge to form a flange-like extension;
 a tension spring having a first end coupled to said release arm and a second end coupled to said weldment plate, said tension spring biased to rotate said release arm in a clockwise direction;
 a lower cam follower disposed on said release arm proximate to and underneath said flange-like extension and positioned to abut and push up on said flange-like extension when said release arm is rotated counter-clockwise; and
 an upper cam follower disposed on said release arm proximate to and above said flange-like extension and positioned to abut and push down on said flange-like extension when said release arm is rotated clockwise.

14. The restraint apparatus of claim 13, wherein said outboard end of said restraint bar comprises a turnbuckle.

15. The restraint apparatus of claim 13, wherein said release arm has an elongate lever portion distant from said upper and lower cam followers.

16. A ramp system for a vehicle having a cargo compartment with a deck, comprising:

a rotatable ramp having a point of rotation proximate to the deck and configured to open outward from the cargo compartment when deployed;

a cable having a first end attached to an interior surface of said ramp and a second end coupled to a winch;

an elongate, rigid restraint bar having an inboard end and an outboard end, said outboard end rotatably mounted to said ramp, said inboard end having a notch disposed on the underside thereof and an end roller mounted on its tip;

a storage bracket mounted on an interior surface within the cargo compartment, said storage bracket configured to accept and hold said inboard end of said restraint bar when the ramp is fully retracted; and a lock/release assembly comprising
 a weldment plate mounted on a bulkhead within the cargo compartment proximate to said ramp,
 a bar support mounted on said weldment plate, said bar support having a rounded edge shaped to accept and hold said notch when the ramp is fully deployed; wherein said restraint bar is configured to travel over said bar support as the ramp is deployed and retracted.

17. The ramp system of claim 16, further comprising a cover plate mounted on said bar support and having a portion extending above said bar support to form a U-shaped channel through which said restraint bar is constrained to travel as the ramp is deployed and retracted.

18. The ramp system of claim 17, further comprising:
 a release arm rotatably mounted to said lock/release assembly;
 a release plate disposed on the upper edge of said inboard end of said restraint bar, said release plate overhanging said upper edge to form a flange-like extension;
 a tension spring having a first end coupled to said release arm and a second end coupled to said weldment plate, said tension spring biased to rotate said release arm in a clockwise direction;
 a lower cam follower disposed on said release arm proximate to and underneath said flange-like extension and positioned to abut and push up on said flange-like extension when said release arm is rotated counter-clockwise; and
 an upper cam follower disposed on said release arm proximate to and above said flange-like extension and positioned to abut and push down on said flange-like extension when said release arm is rotated clockwise.

19. The ramp system of claim 18, wherein said outboard end of said restraint bar comprises a turnbuckle.

20. The ramp system of claim 18, wherein said release arm has an elongate lever portion distant from said upper and lower cam followers.

* * * * *